(12) United States Patent
Chung et al.

(10) Patent No.: US 9,489,059 B2
(45) Date of Patent: Nov. 8, 2016

(54) POINTING DEVICE FOR INTERACTING WITH TOUCH-SENSITIVE DEVICES AND METHOD THEREOF

(71) Applicant: Wai Lung David Chung, Hong Kong (HK)

(72) Inventors: Wai Lung David Chung, Hong Kong (HK); Hiu Kwan Lam, Hong Kong (HK)

(73) Assignee: Wai Lung David Chung, Hong Kong (HK)

( * ) Notice: Subject to any disclaimer, the term of this patent is extended or adjusted under 35 U.S.C. 154(b) by 261 days.

(21) Appl. No.: 14/284,379

(22) Filed: May 21, 2014

(65) Prior Publication Data

US 2014/0362006 A1    Dec. 11, 2014

(30) Foreign Application Priority Data

Jun. 7, 2013  (HK) .................................. 13106809.3

(51) Int. Cl.
    *G06F 3/0354* (2013.01)
    *G06F 3/041* (2006.01)

(52) U.S. Cl.
    CPC ......... *G06F 3/03545* (2013.01); *G06F 3/0416* (2013.01)

(58) Field of Classification Search
    CPC ................ G06F 2203/04808; G06F 3/033; G06F 3/03545; G06F 3/0416; G06F 2203/04103; G06F 2203/04104; G06F 3/0414
    See application file for complete search history.

(56) References Cited

U.S. PATENT DOCUMENTS

| 8,358,286 B2 * | 1/2013 | Cannon | A63F 13/02 345/174 |
| 2011/0095992 A1 * | 4/2011 | Yeh | G06F 3/03543 345/173 |

* cited by examiner

*Primary Examiner* — Latanya Bibbins (57) ABSTRACT

The present application is directed to a pointing device and a method for interacting with touch-sensitive devices. The pointing device includes a base; a housing configured to cover a portion of the base; a cavity formed between the housing and the portion of the base; a sliding member; a supporting member; a biasing member situated between the sliding member and the supporting member; a first contact point provided on the sliding member and configured to contact a screen of the touch-sensitive device when the pointing device is placed on the screen; and a second contact point provided on the supporting member and configured to contact the screen when the pointing device is placed on the screen; wherein the first contact point slides on the screen relative to the second contact point via the engagement of the housing and the sliding member when the housing moves towards the screen.

14 Claims, 8 Drawing Sheets

POINTING DEVICE FOR INTERACTING WITH TOUCH-SENSITIVE DEVICES AND METHOD THEREOF

CROSS-REFERENCE TO RELATED APPLICATIONS

This present application claims the benefit of Hong Kong Short-term Patent Application No. 13106809.3 filed on Jun. 7, 2013; the contents of which are hereby incorporated by reference.

FIELD OF INVENTION

The present application refers to a pointing device to be used on touch screens, more particularly, to a pointing device and a method for interacting with touch-sensitive devices.

BACKGROUND OF INVENTION

Touch-sensitive devices are gaining tremendous popularity in today's consumer electronics market. Such devices are playing important roles in people's daily lives. In the past, pointing devices such as mice and trackballs are commonly used for navigating on the user interface of computers. The buttons of these traditional pointing devices only acknowledge on/off input from the user and are incorporated with complex mechanical/electronic constructions which incurred substantial costs in manufacturing. Moreover, these pointing devices require the user to learn and to get used with the controls through some period of practice. All in all, these pointing devices fail to provide an intuitive way for the user to interact with electronic devices. The present application provides a pointing device to be used on most touch-sensitive devices such as the Apple iPad® which mitigates the inconsistencies and inaccuracies caused by using bare fingers on touch-sensitive devices and allows the control of a range of values by varying the pressure by the user. Further, the present application provides an intuitive way for the user to interact with the touch-sensitive devices.

SUMMARY OF INVENTION

The present patent application is directed to a pointing device for interacting with a touch-sensitive device, includes a base; a housing configured to cover a portion of the base; a cavity formed between the housing and the portion of the base; a sliding member provided inside the cavity, wherein a first side of the sliding member is engaged with the housing and a second side of the sliding member is supported on the base; a supporting member provided inside the cavity and supported on the base; a biasing member situated between the sliding member and the supporting member; a first contact point provided on the sliding member and configured to contact a screen of the touch-sensitive device when the pointing device is placed on the screen; and a second contact point provided on the supporting member and configured to contact the screen when the pointing device is placed on the screen; wherein the first contact point slides on the screen relative to the second contact point via the engagement of the housing and the sliding member when the housing moves towards the screen.

The pointing device for interacting with the touch-sensitive may further include an actuating member provided in the cavity and engaged with the housing; wherein the first side of the sliding member is engaged with the housing via the actuating member.

The actuating member may have a slanted surface; and the first side of the sliding member may be a corresponding slanted surface to the slanted surface of the actuating member.

The supporting member may be fixedly mounted on the base.

The biasing member may be a helical spring; and when a pressure which causes the housing to move towards the screen is released, the housing may return to a default position in which the pressure is not applied on the housing via an elastic force of the spring.

When the pressure is released, the first contact point may slide on the screen away from the second contact point.

The first contact point may slide on the screen towards the second contact point when the housing moves towards the screen.

The base may be non-conductive.

The first contact point may include at least two points.

An opening may be formed on a bottom of the housing; and the base may be coupled with the opening of the housing when the portion of the base is inserted into the housing.

The base may include a plurality of apertures; and the first contact point and the second contact point may be inserted into and through the apertures in order to contact the screen of the touch-sensitive device during use.

The base may include a protruded peripheral edge; and the first contact point and the second contact point may protrude downwardly and be at the same height with a bottom of the protruded peripheral edge in order to contact the screen during use.

A change in displacement of the first contact point relative to the second contact point may depend on a pressure applying on the housing and may be record by the touch-sensitive device.

The change in displacement of the first contact point relative to the second contact point may include a variety of patterns of movements which are detected and recognized by the touch-sensitive device.

Data values of a list of the patterns may be stored in a data file which is accessible by executable applications on the touch-sensitive device.

A device identification may be determined by the touch-sensitive device by comparing and matching a total displacement value of the first contact point and the second contact point before the housing is fully depressed and a displacement value of the first contact point and the second contact point after the housing is fully depressed with a maximum displacement value and a minimum displacement value of each of the patterns stored in the data file.

Once the device identification is determined by the touch-sensitive device, the touch-sensitive device may trigger a predetermined command.

The touch-sensitive device may be an iPad, an iPhone, or any Android equipped touch-sensitive devices.

There is also provided in the present application a method for interacting with the touch-sensitive device using the pointing device of claim 1 includes the steps of:
  a) detecting and recording positions of the first contact point and the second point of the pointing device on the screen of the touch-sensitive device in its default state;
  b) detecting and recording positions of the first contact point and the second point of the pointing device on the screen of the touch-sensitive device in its fully depressed state;

c) determining a change in displacement of the first contact point;
d) determining a distance between the first contact point and the second point in its default state;
e) determining a distance between the first contact point and the second point in its fully depressed state;
f) comparing values of the distances of the step d) and the step e) with preset values stored in a data file; and
g) triggering a command if the values of the step d) and the step e) match with the preset values.

A device identification may be determined by the touch-sensitive device by comparing and matching a total displacement value of the first contact point and the second point before the housing is fully depressed and a displacement value of the first contact point and the second point after the housing is fully depressed with a maximum displacement value and a minimum displacement value of each unique pattern stored in the data file.

DETAILED DESCRIPTION

The present application refers to a pointing device for interacting with touch-sensitive devices and a method for interacting with touch-sensitive devices.

The pointing device may be used for navigating on a touch-sensitive device, or as a component of an entertaining system used with touch-sensitive devices. The pointing device provides up to four types of inputs to the touch-sensitive device, namely, (1) positioning of the device with reference to the screen coordinates; (2) pointing direction of the device; (3) a command actuated by depressing the housing; (4) a continuous range of values when the button is being gradually depressed.

Identification of the pointing device is based on the patterns and the displacements of touch points before-and-after the housing is fully pressed by the user. The structure and components of the pointing device will be discussed in the following.

Figure 1A:
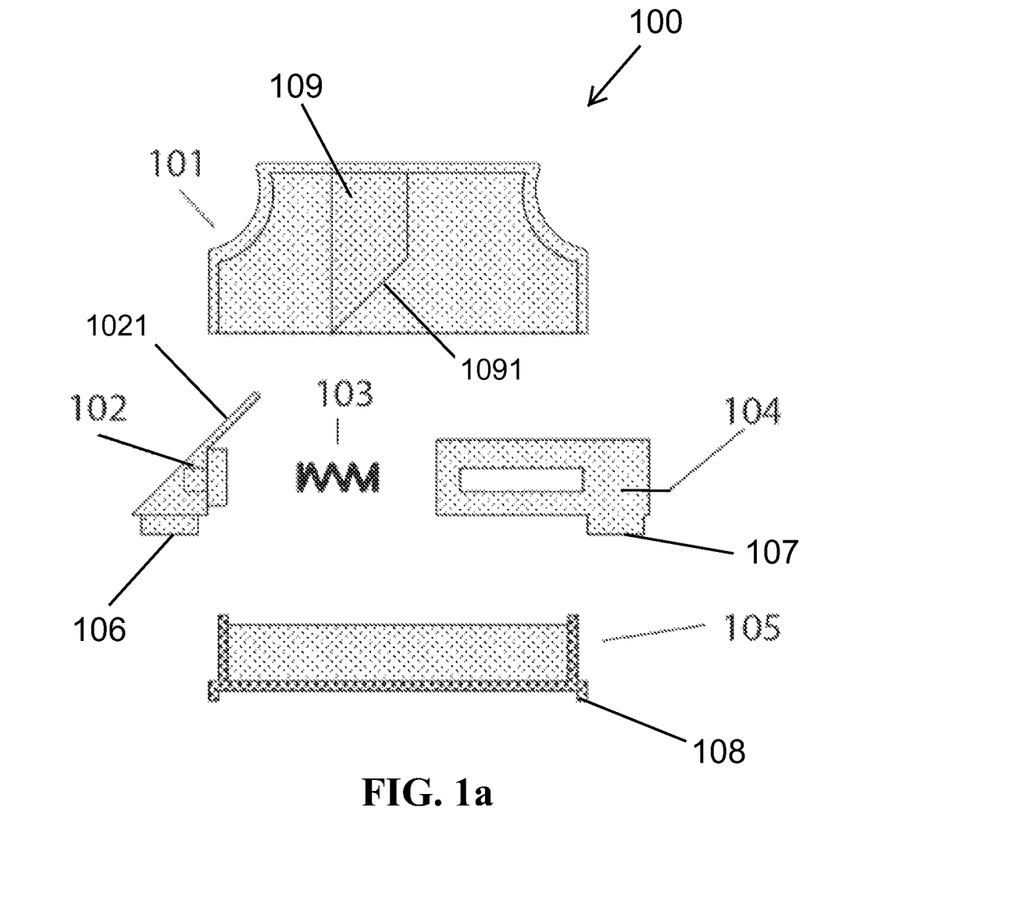
FIG. 1a shows an exploded sectional view of the pointing device of an embodiment of the present application.

An exploded view of the device 100 is shown in FIG. 1a. A housing 101 houses all the components and covers a portion of a base 105. The base 105 may be non-conductive. An opening is formed on the bottom of the housing 101 to receive the base 105. The base 105 is formed in a way so that it is coupled with the opening of housing 101 while a portion of the base 105 is inserted into the housing 101.

Figure 1B:
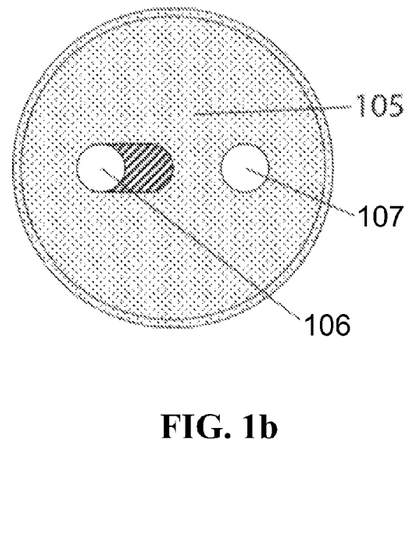
FIG. 1b shows a bottom view of the pointing device of an embodiment of the present application in its default state.
Figure 1C:
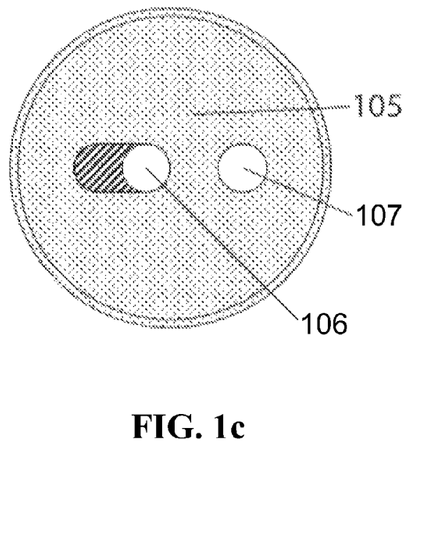
FIG. 1c shows a bottom view of the pointing device of an embodiment of the present application with the housing is fully depressed.

As shown in FIGS. 1b and 1c, a plurality of apertures is provided on the base 105 in accordance with the designated pattern associated with a particular pointing device. A sliding member 102 and a supporting member 104 are provided with contact points 106 and 107 respectively. The contact points 106 and 107 are inserted into and through the apertures provided on the base 105 such that the contact points can be in contact with the surface of the screen of a touch-sensitive device during use. It is appreciated that first contact point 106 is provided on the sliding member 102 and second contact point 107 is provided on the supporting member 104. Moreover, a protruded peripheral edge 108 is provided on the base 105. The contact points 106 and 107 protrude downwardly and are substantially flush (i.e. at the same height) with the bottom of the protruded peripheral edge 108 in order to be in contact with the screen during use.

Figures 1D, 1E:
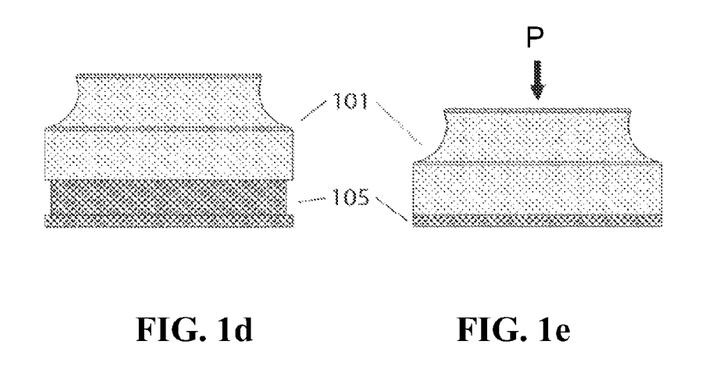
FIG. 1d shows a side view of the pointing device of an embodiment of the present application in its default state.
FIG. 1e shows a side view of the pointing device of an embodiment of the present application with the housing is fully depressed.
Figure 2A:
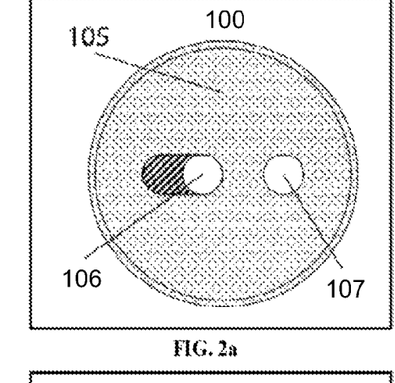
FIG. 2a-2f show examples of embodiment of the present application with different patterns of movement of contact points.
Figure 2B:
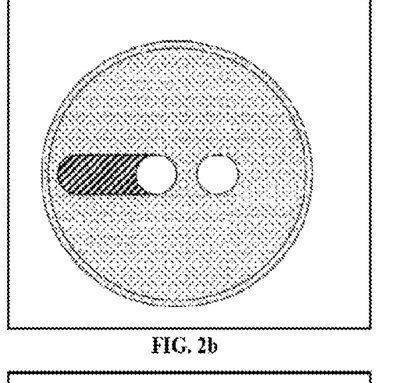
Figure 2C:
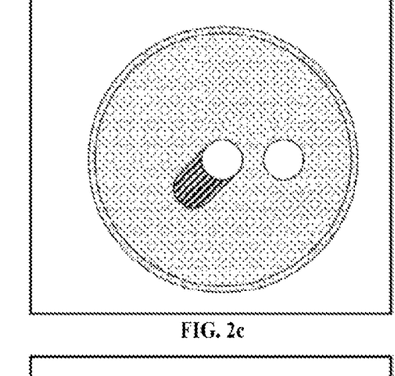
Figure 2D:
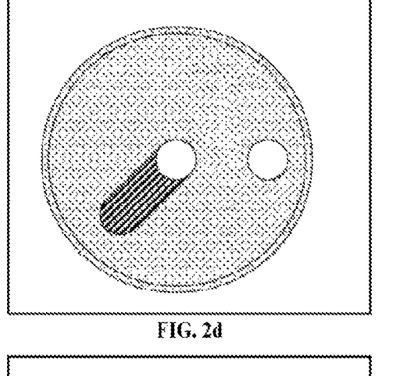
Figure 2E:
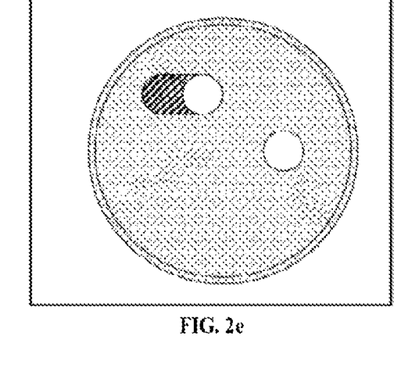
Figure 2F:
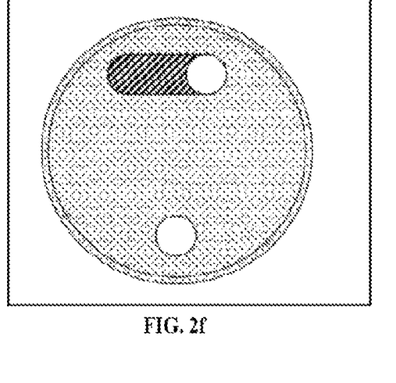

In FIG. 1a, an actuating member 109 is provided in the housing 101 and has a slanted surface 1091 for engaging with the sliding member 102. The sliding member 102 is provided with a corresponding slanted surface 1021. A biasing member 103 in form of a helical spring, as a non-limiting example, is situated between the sliding member 102 and the supporting member 104. FIG. 1a shows an unassembled view of the pointing device 100 indicating the arrangement of the above mentioned components. As a downward pressure is applied on the housing 101 by the user, actuating member 109 pushes downward and the slanted surface 1091 forces the sliding member 102 to move in the direction as shown in FIGS. 1b-1c. The supporting member 104 is fixedly mounted on the base 105 and causes the biasing member 103 in between to be compressed. Once the user releases the pressure on the housing 101, the biasing member 103 decompresses and pushes the sliding member 102 back to its default position. Further, the slanted surface 1021 of the sliding member 102 forces the housing 101 to rise to its default position. As the sliding member 102 moves, the first contact point 106 displaces relative to the second contact point 107 which is formed with the supporting member 104. FIG. 1d and FIG. 1e illustrate the device 100 when pressure is applied.

Figure 3:
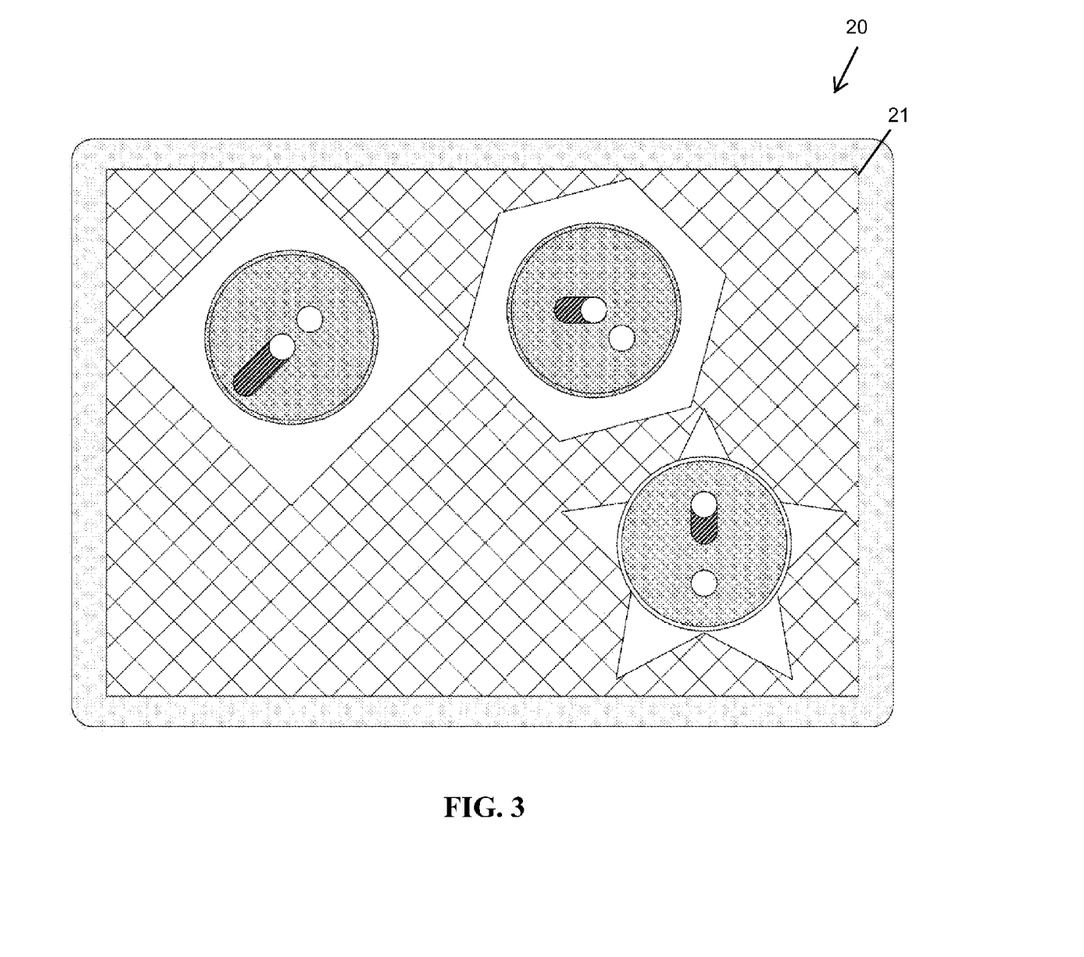
FIG. 3 shows an example of three pointing devices of different patterns being used on a touch-sensitive device.

When the pointing device 100 is placed on a screen of a touch-sensitive device and pressure is applied on the housing 101, i.e., the housing is being fully pressed downward, the contact points 106, 107 are pressed against and in contact with the surface of the screen and causes first contact point 106 to slide relative to second contact point 107. The sliding movement of first contact point 106 relative to second contact point 107 forms a pattern which is detected and recognized by the touch-sensitive device. Once the movement pattern is detected by the touch-sensitive device, subsequent actions may be executed to indicate the system acknowledged the input, for a non-limiting example, an image corresponds to that particular device 100 may be displayed on the screen 21 as shown in FIG. 3. It is appreciated that data values of a list of patterns are stored in the data file which is accessible by executable applications on the touch-sensitive device 20.

FIGS. 2a-2f show a variety of patterns of movements of the first contact point 106 relative to second contact point 107. These unique patterns are individually recognized by the touch-sensitive device according to the data values in a predetermined list of patterns as mentioned. Details of how the patterns are interpreted by the touch-sensitive device will be discussed in the following.

Figure 4A:
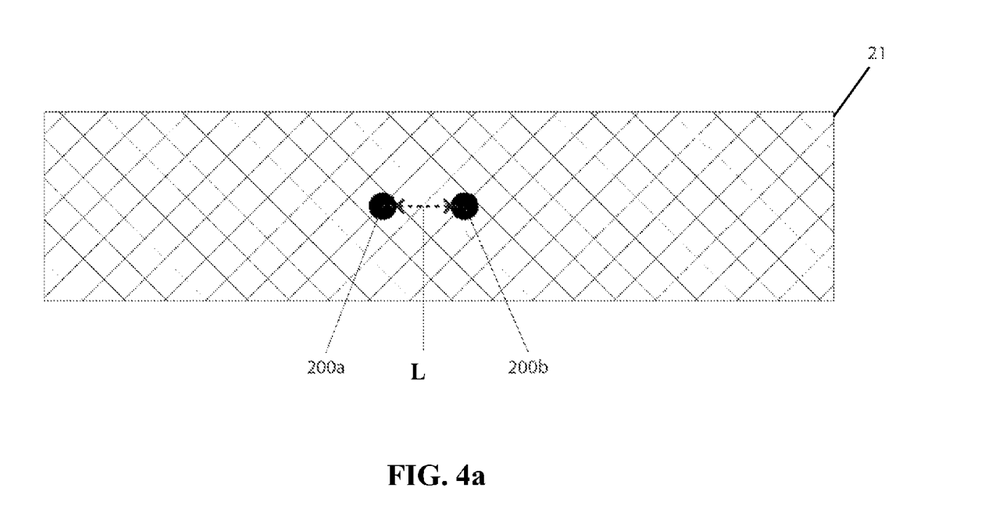
FIG. 4a shows the touch points detected on the screen by the touch-sensitive device where the pointing device is in its default state.

Reference is made to FIG. 4a. For a non-limiting example, the two contact points 106 and 107 of the pointing device 100 are in contact with the screen 21, positions in terms of X and Y coordinates of the two touch points 200a and 200b on the screen 21 are detected and registered by the touch-sensitive device 20.

Figure 4B:
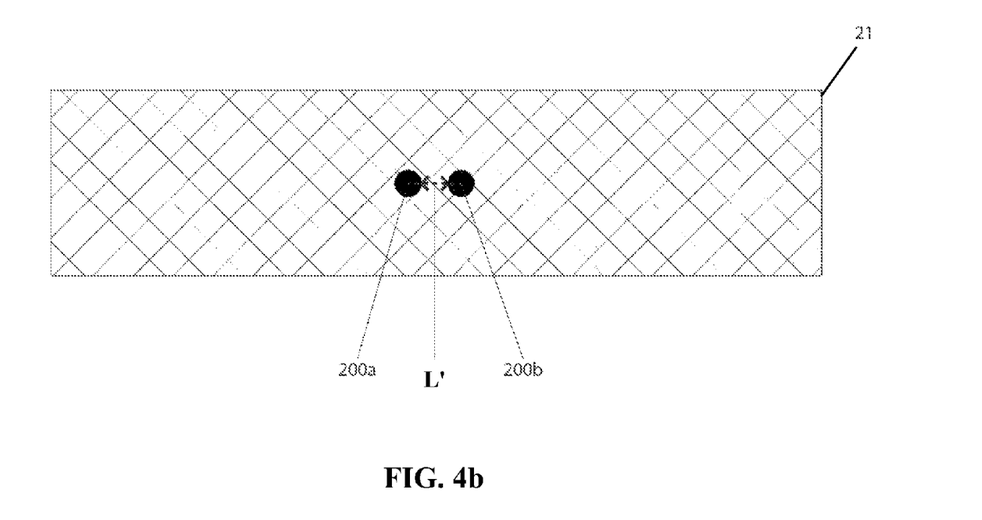
FIG. 4b shows the touch points detected on the screen by the touch-sensitive device where the pointing device's housing is fully depressed.
Figure 6A:
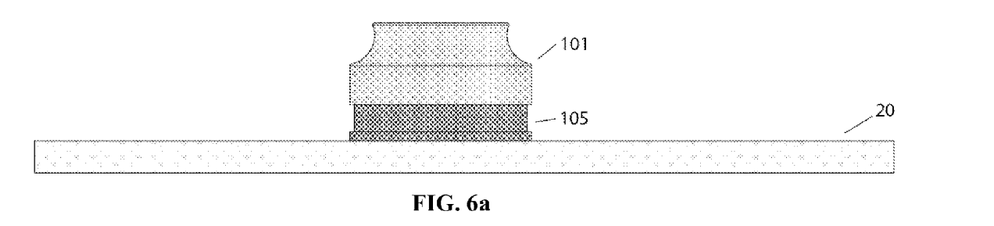
FIGS. 6a and 6b show an elevation view and a cutaway view of the pointing device and the default positions of the contact points before the housing is pressed down.
Figure 6B:
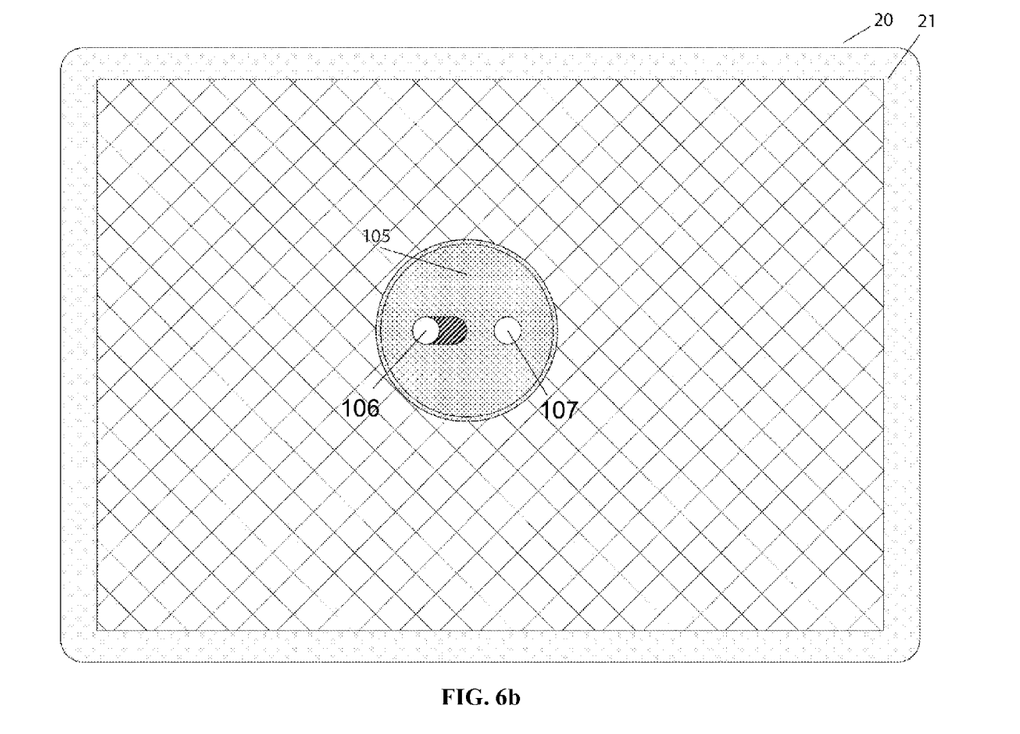
Figure 7A:
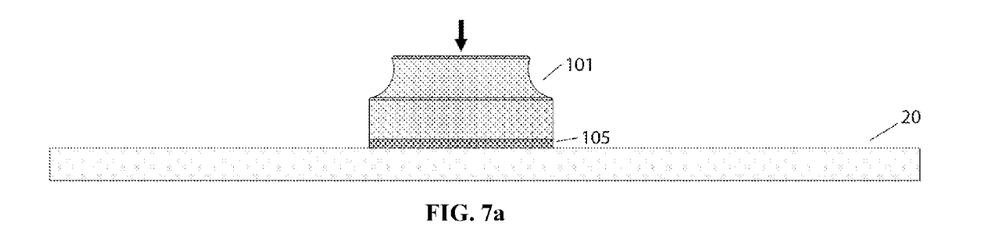
FIGS. 7a and 7b show an elevation view and a cutaway view of the pointing device and the positions of the contact points when the housing is pressed down by a user.
Figure 7B:
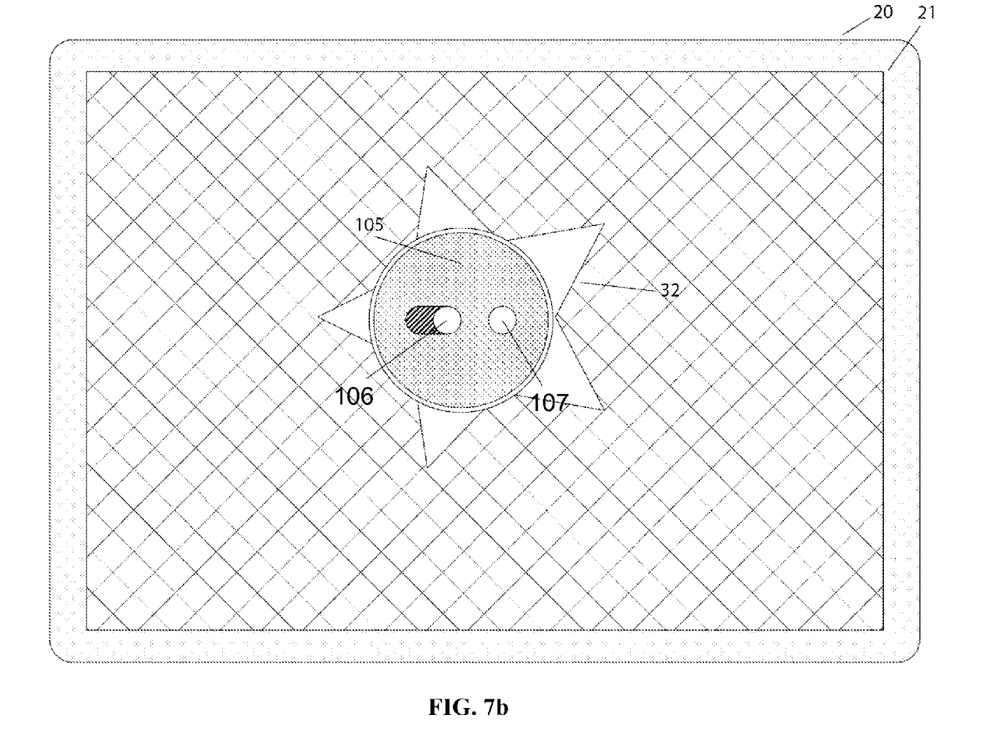

When housing 101 is depressed, the movable first contact point 106 slides to a direction relative to second contact point 107. In the example, first contact point 106 moves closer to second contact point 107 in a horizontal direction as shown in FIG. 4b. It is appreciated that the touch points 200a and 200b correspond to the movements of contact points 106 and 107. FIGS. 6a and 6b show a elevation view and a cutaway view of the device and the default positions of the contact points 106 and 107 before the housing 101 is pressed down, while FIGS. 7a and 7b show an elevation view and a cutaway view of the device and the positions of the contact points 106 and 107 when the housing 101 is pressed down by a user. An image example 32 is displayed on the screen 21 indicating the pointing device 100 is identified by the touch-sensitive device based on the list of patterns stored in the data file.

Figure 5:
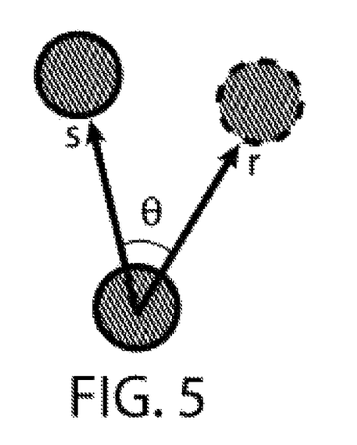
FIG. 5 shows the change of pointing direction of the device.

Referring to FIG. 5, assume the movable contact point is being recognized and the corresponding finger IDs are matched and recorded. Regardless of the state of the pointing device, the pointing direction of the device is determined by vector s generated by the current positions of the two contact points with reference to vector r generated by the last recorded positions of the two contact points. The degree of rotation of the pointing device depends on angle θ in-between vector r and vector s. For example, if there is an image attached with the position of the device, the orientation changes depending on angle θ in-between vector r and vector s, indicating the change of pointing direction of the device.

The two individual touch points 200a and 200b are differentiated by the absolute delta change in displacement of each touch point with reference to its previous position recorded, i.e., before any change of displacement takes place.

Let x1, y1 and x2, y2 be the x and y coordinates of touch points 200a and 200b of their previous positions respectively (the housing is not pressed down), and Let x1', y1' and x2', y2' be the x and y coordinates of touch points 200a and 200b of their current positions respectively (the housing is fully pressed down).

Accordingly, the absolute change in displacement of touch point 200a, ΔD1, may be determined by:

$$\Delta D_1 = \sqrt{|(x_1'-x_1)^2+(y_1'-y_1)^2|}$$

While the absolute change in displacement of touch point 200b, ΔD2, may be determined by:

$$\Delta D_2 = \sqrt{|(x_2'-x_2)^2+(y_2'-y_2)^2|}$$

As second contact point 107 (touch point 200b) in the above example is a fixed contact point, ΔD2 is theoretically 0.

The value of ΔD1 reflects the pressure act on the housing 101 on the screen 21. The more pressure is act on the housing, the farther the sliding member 102 travels and higher the value of ΔD1 is resulted. The change of the pressure level acting on the housing 101 is transformed to numerical values for controlling a range of values on the touch-sensitive device. For examples, the change of the pressure level may be used for controlling sliders or scrolling pages.

In order for the touch-sensitive device to identify and distinguish a specific pointing device, the direct distance between the touch points is determined. L signifies the initial direct distance between the two touch points, i.e., 200a and 200b, and L' represents the direct distance between 200a and 200b after the housing 101 is fully depressed.

The values L and L' are then stored in the memory of the touch-sensitive device and routines are executed to compare these values with the preset values of $L_{max}$ and $L_{min}$ in the list of patterns in a data file. $L_{max}$ is the variable of the maximum allowed distance between the two touch points, and $L_{min}$ is the variable of the minimum allowed distance between the two touch points. The values of $L_{max}$ and $L_{min}$ of each pattern are unique and are accessible by executable applications. Upon comparison of these values and a match is found, a specific command may be executed. For a non-limiting example, a corresponding image of the particular device will be displayed to acknowledge the identification of the device as shown in FIG. 3.

Both L and L' allow maximum absolute error S by default 0.1 cm but not limited to this value.

To be validated, both L and L' must also satisfy the following equation:

$$|L_{measured} - L_{data}| \leq S$$

$L_{measured}$ represents either L or L'. $L_{data}$ represents either $L_{max}$ or $L_{min}$.

The abovementioned pointing device and method of the present application utilize at least one movable touch point rather than two fixed touch points so that a $L_{max}$ and $L_{min}$ between the two touch points may be determined to serve the purpose of increasing the matching requirement of the recorded values with the preset values in the data file. Assuming only two fixed touch points are used, the recognition of patterns would merely base on the distance L between the two touch points. As a result, a user may easily imitate the touch point pattern by placing fingers on the screen. This is of particular significance when the pointing device is to be used in games and applications where the strict use of the device is essential.

The pointing device and method of the present application allow the determination of the position and orientation of the device on a touch-sensitive device with least number of touch points required. The same also allow interactive inputs by the user such as clicking, double clicking, sliding and scrolling, dragging and dropping of objects displayed on the screen of the touch-sensitive device. Furthermore, it is another advantage of the present application that multi-touch gestures can be simulated for interacting with designated applications on the touch-sensitive devices.

It may be appreciated that various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A pointing device for interacting with a touch-sensitive device, comprising:
a base;
a housing configured to cover a portion of the base;
a cavity formed between the housing and the portion of the base;
a sliding member provided inside the cavity, wherein a first side of the sliding member is engaged with the housing and a second side of the sliding member is supported on the base;
a supporting member provided inside the cavity and supported on the base;
a biasing member situated between the sliding member and the supporting member;
a first contact point provided on the sliding member and configured to contact a screen of the touch-sensitive device when the pointing device is placed on the screen;
a second contact point provided on the supporting member and configured to contact the screen when the pointing device is placed on the screen; and
an actuating member provided in the cavity and engaged with the housing;
wherein the first contact point slides on the screen relative to the second contact point via the engagement of the housing and the sliding member when the housing moves towards the screen; the first side of the sliding member is engaged with the housing via the actuating member; the actuating member has a slanted surface; and the first side of the sliding member is a corresponding slanted surface to the slanted surface of the actuating member.

2. The pointing device for interacting with the touch-sensitive device of claim 1, wherein:
the supporting member is fixedly mounted on the base.

3. The pointing device for interacting with the touch-sensitive device of claim 1, wherein:
the biasing member is a helical spring; and
when a pressure which causes the housing to move towards the screen is released, the housing returns to a default position in which the pressure is not applied on the housing via an elastic force of the spring.

4. The pointing device for interacting with the touch-sensitive device of claim 3, wherein:
when the pressure is released, the first contact point slides on the screen away from the second contact point.

5. The pointing device for interacting with the touch-sensitive device of claim 1, wherein:
the first contact point slides on the screen towards the second contact point when the housing moves towards the screen.

6. The pointing device for interacting with the touch-sensitive device of claim 1, wherein:
the base is non-conductive.

7. The pointing device for interacting with the touch-sensitive device of claim 1, wherein:
the first contact point comprises at least two points.

8. The pointing device for interacting with the touch-sensitive device of claim 1, wherein:
an opening is formed on a bottom of the housing; and
the base is coupled with the opening of the housing when the portion of the base is inserted into the housing.

9. The pointing device for interacting with the touch-sensitive device of claim 1, wherein:
a change in displacement of the first contact point relative to the second contact point depends on a pressure applying on the housing and is record by the touch-sensitive device.

10. The pointing device for interacting with the touch-sensitive device of claim 9, wherein:
the change in displacement of the first contact point relative to the second contact point comprises a variety of patterns of movements which are detected and recognized by the touch-sensitive device.

11. A pointing device for interacting with a touch-sensitive device, comprising:
a base;
a housing configured to cover a portion of the base;
a cavity formed between the housing and the portion of the base;
a sliding member provided inside the cavity, wherein a first side of the sliding member is engaged with the housing and a second side of the sliding member is supported on the base;
a supporting member provided inside the cavity and supported on the base;
a biasing member situated between the sliding member and the supporting member;
a first contact point provided on the sliding member and configured to contact a screen of the touch-sensitive device when the pointing device is placed on the screen; and
a second contact point provided on the supporting member and configured to contact the screen when the pointing device is placed on the screen;
wherein:
the first contact point slides on the screen relative to the second contact point via the engagement of the housing and the sliding member when the housing moves towards the screen; an opening is formed on a bottom of the housing; the base is coupled with the opening of the housing when the portion of the base is inserted into the housing; the base comprises a plurality of apertures; and the first contact point and the second contact point are inserted into and through the apertures in order to contact the screen of the touch-sensitive device during use.

12. The pointing device for interacting with the touch-sensitive device of claim 11, wherein:
the base comprises a protruded peripheral edge; and
the first contact point and the second contact point protrude downwardly and are at the same height with a bottom of the protruded peripheral edge in order to contact the screen during use.

13. A method for interacting with a touch-sensitive device using a pointing device, wherein the point device comprises:
a base;
a housing configured to cover a portion of the base;
a cavity formed between the housing and the portion of the base;
a sliding member provided inside the cavity, wherein a first side of the sliding member is engaged with the housing and a second side of the sliding member is supported on the base;
a supporting member provided inside the cavity and supported on the base;
a biasing member situated between the sliding member and the supporting member;

a first contact point provided on the sliding member and configured to contact a screen of the touch-sensitive device when the pointing device is placed on the screen; and a second contact point provided on the supporting member and configured to contact the screen when the pointing device is placed on the screen;

wherein the first contact point slides on the screen relative to the second contact point via the engagement of the housing and the sliding member when the housing moves towards the screen;

wherein the method comprises the steps of:
a) detecting and recording positions of the first contact point and the second point of the pointing device on the screen of the touch-sensitive device in its default state;
b) detecting and recording positions of the first contact point and the second point of the pointing device on the screen of the touch-sensitive device in its fully depressed state;
c) determining a change in displacement of the first contact point;
d) determining a distance between the first contact point and the second point in its default state;
e) determining a distance between the first contact point and the second point in its fully depressed state;
f) comparing values of the distances of the step d) and the step e) with preset values stored in a data file; and
g) triggering a command if the values of the step d) and the step e) match with the preset values.

14. The method for interacting with the touch-sensitive device using the pointing device of claim 13, wherein a device identification is determined by the touch-sensitive device by comparing and matching a total displacement value of the first contact point and the second point before the housing is fully depressed and a displacement value of the first contact point and the second point after the housing is fully depressed with a maximum displacement value and a minimum displacement value of each unique pattern stored in the data file.

* * * * *